INVENTORS
MAURICE E. KLICKSTEIN
REUBEN B. KLICKSTEIN

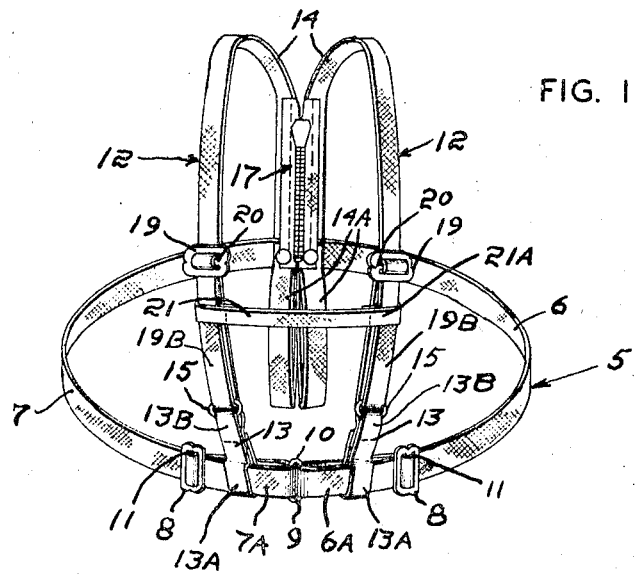
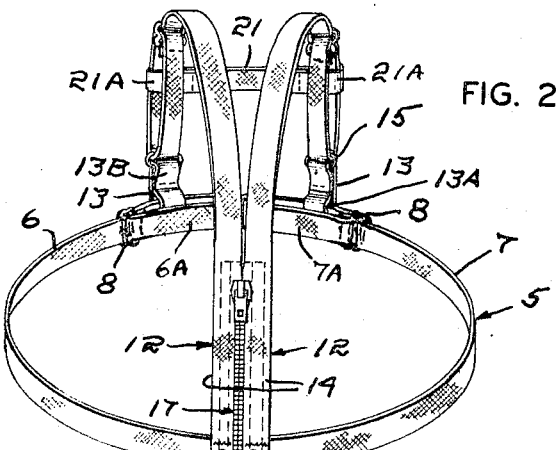
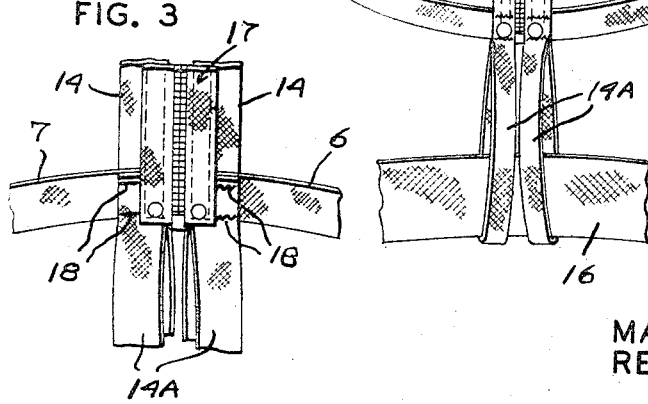

BY *Albert Spear*,
ATTORNEY

United States Patent Office 3,428,029
Patented Feb. 18, 1969

3,428,029
INFANT'S HARNESS FOR USE WITH SEAT BELTS
Maurice E. Klickstein, 38 Varick Road, Newton, Mass. 02158, and Reuben B. Klickstein, 125 Chiswick Road, Brighton, Mass. 02135
Continuation-in-part of application Ser. No. 552,571, May 24, 1966. This application July 25, 1966, Ser. No. 573,145
U.S. Cl. 119—96
Int. Cl. A01k 29/00; A62b 1/16, 35/00
5 Claims

ABSTRACT OF THE DISCLOSURE

Safety harness for infants in which loops are provided centrally of the back portion to slidably receive a retaining member.

---

The present invention relates to safety harnesses for infants for use with seat belts and the present invention is a continuation-in-part of our co-pending application, Ser. No. 552,571, filed May 24, 1966, and now abandoned.

While motor vehicle seat belts are widely used, these are not adapted for use with small children in general and infants in particular. The particular objective of the present invention is to provide a harness adapted for general use as a safety harness, but particularly adapted for infants, that may be easily attached to a seat belt, afford limited degree of movement relative thereto, and provide maximum protection against injury in the event of an accident or sudden stop.

A further objective of the invention is to incorporate the above generally referred-to-attributes in a safety harness of the type having its opening and closing effected by releasably joining the shoulder straps at the back of the harness.

In accordance with the invention, the general objective is attained with an infant's harness having a body encircling belt, a pair of shoulder straps connected to the harness belt at the front and back of the harness and with means releasably connecting the ends of the harness belt between corresponding shoulder strap ends. The invention provides loop means centrally of the back of the harness dimensioned to slidably accommodate a retainer such as a seat belt or a member attached thereto. With this arrangement, the pull on the infant's body, in the event of an accident or sudden stop, is centrally of his back and its effect is satisfactorily distributed relative to the person of the wearer.

With the harness belt connected between the shoulder straps at the back of the harness and with each shoulder strap having its rear end doubled over and anchored to itself and to the appropriate seat belt end to provide loops for the seat belt, maximum strength and safety are combined. Such loops may depend below the harness belt or be disposed upwardly against and anchored to the shoulder straps.

In the accompanying drawings, there is shown an illustrative embodiment of the invention from which these and other of its objectives, novel features, and advantages will be apparent.

In the drawings:

FIGURE 1 is a front perspective view of an infant's safety harness,

FIGURE 2 is a rear perspective view thereof with the harness anchored by a seat belt.

Figure 4:
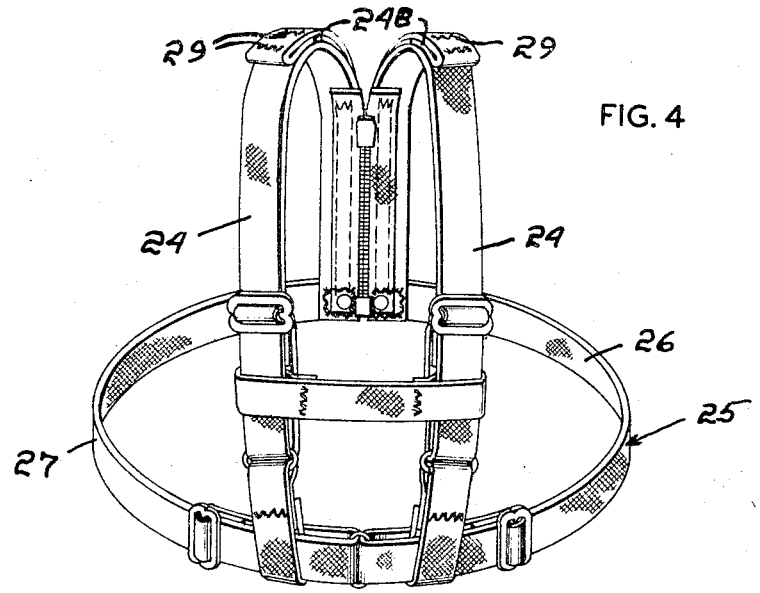
Figure 6:
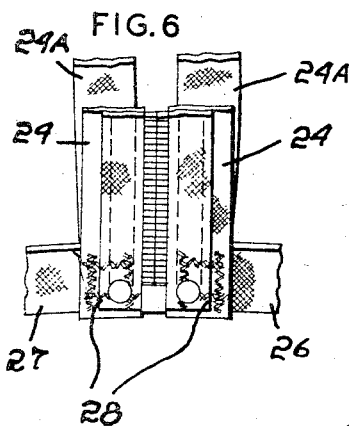
Figure 5:
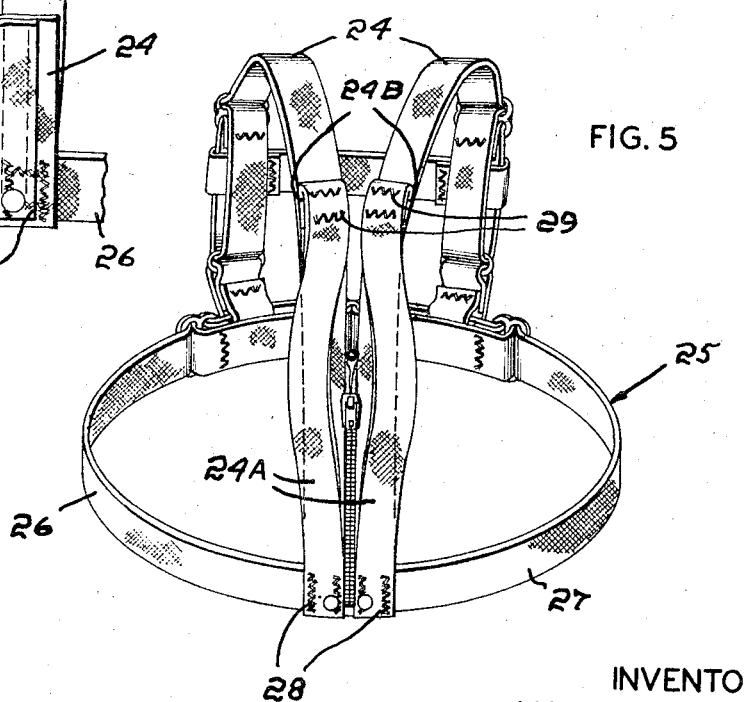

FIGURE 3 is a fragmentary view on an enlarged scale, of the junction of the loop-forming shoulder strap ends with the rear ends of the belt sections, FIGURE 4 is a view similar to FIGURE 1 illustrating another embodiment of the invention, FIGURE 5 is a rear perspective view thereof, and FIGURE 6 is a fragmentary view of the junction of the shoulder straps with the rear end of the belt sections as viewed from the front of the harness.

The safety belt of the safety harness is indicated generally at 5 and consists of sections 6 and 7. At the front of the harness, each of the belt sections is passed through a slide 8 and through the slot 9 of a connector 10 and then looped about the central bar 11 of the slide 8 and stitched to itself thereby to effect the permanent junction of the belt sections at the front of the harness while providing belt adjustability. The construction provides end belt loops at the front of the harness designated by the addition of the suffix A to the reference numeral for the appropriate belt section.

Each of a pair of shoulder straps, generally indicated at 12, consists of a first section 13 and a second section 14. Each first strap section 13 has one end passed about an appropriate belt end loop and doubled upon and stitched to itself to provide a loop 13A and its other end passed through a connector 15 and doubled upon and stitched to itself to provide a loop 13B.

The rear end of each second shoulder strap section 14 extends below the belt 5 at the back of the harness and is doubled upon and anchored to itself and to the rear end of an appropriate one of the belt sections to provide a depending loop 14A slidably to receive a retainer such as a seat belt indicated at 16 in FIGURE 2. The strap sections 14 are joined together at the back of the harness by a slide fastener unit 17.

As shown in FIGURE 3, each shoulder strap section 14 extends over the outer face at the open end of the appropriate belt section with the end of its loop-forming section overlying the inner surface thereof and securely anchored together through that belt end as by stitching 18.

The front end of each second shoulder strap section 14 is passed through a slide 19 and through the connector 15 and then looped about the central bar 20 of the slide 19 and stitched to itself to provide a loop 19B. By this construction, the strap sections 13 and 14 are permanently interconnected while providing shoulder strap adjustability.

A breast strap 21 has its end passed through the loops 19B and doubled upon and stitched to itself to provide loops 21A slidable relative to the shoulder straps within the limits of the loops 19B.

The embodiment of the invention illustrated by FIGURES 4-6 shows a harness of the same construction but with each second shoulder strap section 24 folded outwardly and upwardly about the rear end of the appropriate one of the sections 26, 27 of the generally indicated belt 25 with the three layers stitched together as at 28. The free end of each strap end portion 24A is doubled back as at 24B with stitching 29 joining the doubled end 24B to the appropriate one of the strap sections 24 thus to provide a retainer receiving loop centrally of the back of the harness above the belt 15.

With these constructions, not only is a safety harness provided that is strong and cannot be opened by the infant but also its construction makes it well adapted for use with safety seat belts in automobiles. Ease of attachment and limited movement of the infant relative to the seat are provided and, in the event of an accident or sudden stop, the pull is centrally at the back of the harness and properly distributed. It will be appreciated that the materials used including the connectors and the slide fasteners, as well as the type of stitching, bar tack or box stitching, for example, are selected to insure that safety standards are satisfactorily met.

We claim:

1. In a safety harness for use with a retaining member, a body encircling belt, a pair of shoulder straps connected to said harness belt at the front and back of the harness, the connection of the straps at the back of the harness being fixed, means releasably connecting the ends of the harness belt between one pair of corresponding shoulder strap ends, and a pair of loop means centrally of the back of the harness to slidably accommodate the retaining member, each loop means including the rear end portion of a shoulder strap.

2. The harness of claim 1 in which the loop means depend below the harness belt and the extremity of each end portion is secured to the belt.

3. The harness of claim 1 in which the connection between each shoulder strap at the back of the harness fixes the strap to the outer surface of the belt and the extremity of each end portion to the inner surface thereof.

4. The harness of claim 1 in which the extremity of each end portion is secured to the strap of which it is a part above the belt.

5. The harness of claim 1 in which the connection between each shoulder strap at the back of the harness fixes the strap to the inner surface of the belt, each end portion extends upwardly and outwardly about the belt and is fixed by said connection and the extremity of each end portion is fixed to the strap of which it is a part above the belt.

References Cited

UNITED STATES PATENTS

| | | | |
|---|---|---|---|
| 1,288,170 | 12/1918 | Pick | 119—96 |
| 1,300,914 | 4/1919 | Barnhart | 119—96 |
| 2,212,746 | 8/1940 | Nunn | 119—96 |
| 2,563,766 | 8/1951 | Weinstein et al. | 119—96 |
| 2,695,052 | 11/1954 | Yates et al. | 119—96 X |
| 2,855,133 | 10/1958 | Mullin | 224—5 |
| 3,004,519 | 10/1961 | Weissman | 119—96 |
| 3,053,230 | 9/1962 | Klickstein et al. | 119—96 |
| 3,088,438 | 5/1963 | Oliphant | 119—96 |
| 3,276,431 | 10/1966 | Murcott | 119—96 |

ALDRICH F. MEDBERY, *Primary Examiner.*

U.S. Cl. X.R.

2—49; 182—3; 224—5; 297—254